(12) United States Patent
Omori et al.

(10) Patent No.: US 8,132,858 B2
(45) Date of Patent: Mar. 13, 2012

(54) VEHICLE SEAT WITH CUSHION PLATE

(75) Inventors: Misao Omori, Tochigi (JP); Kenichi Niitsuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 13/106,318

(22) Filed: May 12, 2011

(65) Prior Publication Data

US 2011/0210588 A1 Sep. 1, 2011

Related U.S. Application Data

(62) Division of application No. 12/707,095, filed on Feb. 17, 2010, now Pat. No. 7,963,599, which is a division of application No. 11/718,309, filed as application No. PCT/JP2005/019937 on Oct. 28, 2005, now Pat. No. 7,967,380.

(30) Foreign Application Priority Data

Oct. 28, 2004 (JP) .................................. 2004-313623

(51) Int. Cl.
B60N 2/42 (2006.01)
A47C 7/46 (2006.01)

(52) U.S. Cl. .............. 297/216.12; 297/216.1; 297/284.4

(58) Field of Classification Search ............... 297/216.1, 297/216.12, 284.4, 284.7
See application file for complete search history.

(56) References Cited

U.S. PATENT DOCUMENTS

| | | | |
|---|---|---|---|
| 4,632,454 A | 12/1986 | Naert | |
| 5,076,643 A | 12/1991 | Colasanti et al. | |
| 6,139,102 A | 10/2000 | von Möller | |
| 6,250,714 B1 | 6/2001 | Nakano et al. | |
| 6,260,921 B1 | 7/2001 | Chu et al. | |
| 6,375,262 B1 | 4/2002 | Watanabe | |
| 6,568,753 B1 | 5/2003 | Watanabe | |
| 6,702,377 B2 | 3/2004 | Nakano | |
| 6,783,177 B1 | 8/2004 | Nakano | |
| 6,789,845 B2 | 9/2004 | Farquhar et al. | |
| 6,789,846 B2 * | 9/2004 | Humer et al. ............ | 297/216.12 |
| 6,918,633 B2 | 7/2005 | Forkel et al. | |
| 6,955,397 B1 | 10/2005 | Humer | |
| 7,044,544 B2 | 5/2006 | Humer et al. | |
| 7,052,087 B2 | 5/2006 | McMillen | |
| 7,077,472 B2 | 7/2006 | Steffens, Jr. | |
| 7,104,602 B2 | 9/2006 | Humer et al. | |
| 7,270,374 B2 | 9/2007 | Moriggi | |
| 7,393,052 B2 | 7/2008 | Humer et al. | |
| 7,644,987 B2 | 1/2010 | Humer et al. | |
| 2009/0001785 A1 | 1/2009 | Swan et al. | |

FOREIGN PATENT DOCUMENTS

JP 7-75608 A 3/1995
(Continued)

*Primary Examiner* — Sarah B McPartlin
(74) *Attorney, Agent, or Firm* — Drinker Biddle & Reath LLP

(57) ABSTRACT

A vehicle seat comprises a rectangular-shaped seat back frame having right and left side frames; a flexible plate member provided between the right and left side frames; a seat back cushion provided in front of the flexible plate member; a mechanism for pushing the seat back cushion to a front direction by forwardly protruding the flexible plate member that results from the flexible plate member being bent; a headrest for supporting a head of a seat occupant, wherein the headrest is forwardly movably connected to the right and left side frames via right and left link members; and a rear-end collision detecting plate disposed at a portion of the seat back frame behind the seat occupant, wherein the rear-end collision detecting plate detects rearward movement of the seat occupant.

45 Claims, 8 Drawing Sheets

FOREIGN PATENT DOCUMENTS

| | | |
|---|---|---|
| JP | 10-138811 A | 5/1998 |
| JP | 10-138814 A | 5/1998 |
| JP | 11-034708 A | 2/1999 |
| JP | 11-192869 A | 7/1999 |
| JP | 11-206506 A | 8/1999 |
| JP | 2000-201769 A | 7/2000 |
| JP | 2000-210157 A | 8/2000 |
| JP | 2003-341401 A | 12/2003 |

* cited by examiner

VEHICLE SEAT WITH CUSHION PLATE

CROSS-REFERENCE TO RELATED APPLICATIONS

This application is a divisional application of U.S. patent application Ser. No. 12/707,095, filed Feb. 17, 2010, which is a divisional application of U.S. patent application Ser. No. 11/718,309, filed Nov. 21, 2007, which is a PCT national stage entry of international patent application no. PCT/JP2005/19937, filed Oct. 28, 2005, which claims the foreign priority benefit of Japanese patent application no. JP2004-313623, filed Oct. 28, 2004. The contents of these applications are herein incorporated by reference.

TECHNICAL FIELD

The present invention relates to a vehicle seat, and particularly to a vehicle seat having a cushion plate with a pressure adjusting mechanism.

BACKGROUND

A conventional seat back cushion for a vehicle seat is resiliently supported by means of a number of seat springs which are located between side frames of a seat back frame. The seat springs generally comprise zigzag springs or formed wire springs.

The degree of bending of the seat springs locally vary depending on the magnitude of load imparted. The springs located in the upper and lower portions of the seat back frame are more bent than those located in the central portion of the seat back frame. Even in one spring, the central part of the spring is more bent than the right and left side parts of the spring. Thus, the degree of bending of the springs are locally varied. This brings about deterioration of the stability and comfort of the seat when a person sits on the seat.

Japanese Patent Application Laid-Open No. 11-206506 discloses a structural arrangement where an auxiliary plate, which is forwardly and rearwardly movable, is provided in connection with the cushion plate.

The auxiliary plate disclosed in Japanese Patent Application Laid-Open No. 11-206506 is integrally formed at the central part of the cushion plate, and the cushion plate is disposed only around the auxiliary plate. Therefore, the cushion plate disposed around the auxiliary plate fails to exhibit its function as the mechanism for resiliently supporting the seat back cushion. This means that a load of the seated person is focused on the auxiliary plate and is not effectively dispersed in the cushion plate.

Also in the conventional technique, it is difficult to provide both of a pressure adjusting mechanism of the cushion plate and an active headrest mechanism for moving the headrest to the front when the vehicle rear-end collision occurs in the seat back. In other words, the pressure adjusting mechanism lowers a sensitivity of a collision detector of the active headrest mechanism, and hence, it is difficult to coexistently provide both of the mechanisms.

SUMMARY

Accordingly, an object of various embodiments of the present invention is to provide a cushion plate with a pressure adjusting mechanism which is able to support the seated person while effectively dispersing the load of the seated person.

Another object is to provide a vehicle seat having a cushion plate with a pressure adjusting mechanism and an active headrest mechanism for moving the headrest to the front when the vehicle rear-end collision occurs.

In more detail, various embodiments of the invention provide a vehicle seat comprising: a seat back frame; a headrest for supporting a head of a seat occupant, wherein the headrest is forwardly movably connected to the seat back frame; a rear-end collision detector mounted to the seat back frame at a position behind the seat occupant, wherein the rear-end collision detector detects rearward movement of the seat occupant and moves rearward; and the rear-end collision detector is operatively connected to the headrest such that the rearward movement of the rear-end collision detector forwardly moves the headrest; a headrest support for supporting the headrest that extends in a horizontal direction, wherein the headrest support is movably connected to a side frame that constitutes a side portion of the seat back frame through a link member; a bracket mounted to the side frame, wherein a link support shaft is mounted to the bracket and wherein the link member is movably mounted to the link support shaft; a front extending portion inwardly extending in a right-to-left direction and formed at a front end of a lateral face of the side frame; and a rear extending portion inwardly extending in the right-to-left direction and formed at a rear end of the lateral face of the side frame; wherein: a concave portion is formed at a portion of an inner end portion of the front extending portion of the side frame that faces at least a part of the bracket; and the concave portion is disposed at a position facing the link support shaft.

BRIEF DESCRIPTION OF THE DRAWINGS

The following drawings illustrate an embodiment of the invention that is described in more detail below.

DETAILED DESCRIPTION OF THE EMBODIMENTS

Figure 1:
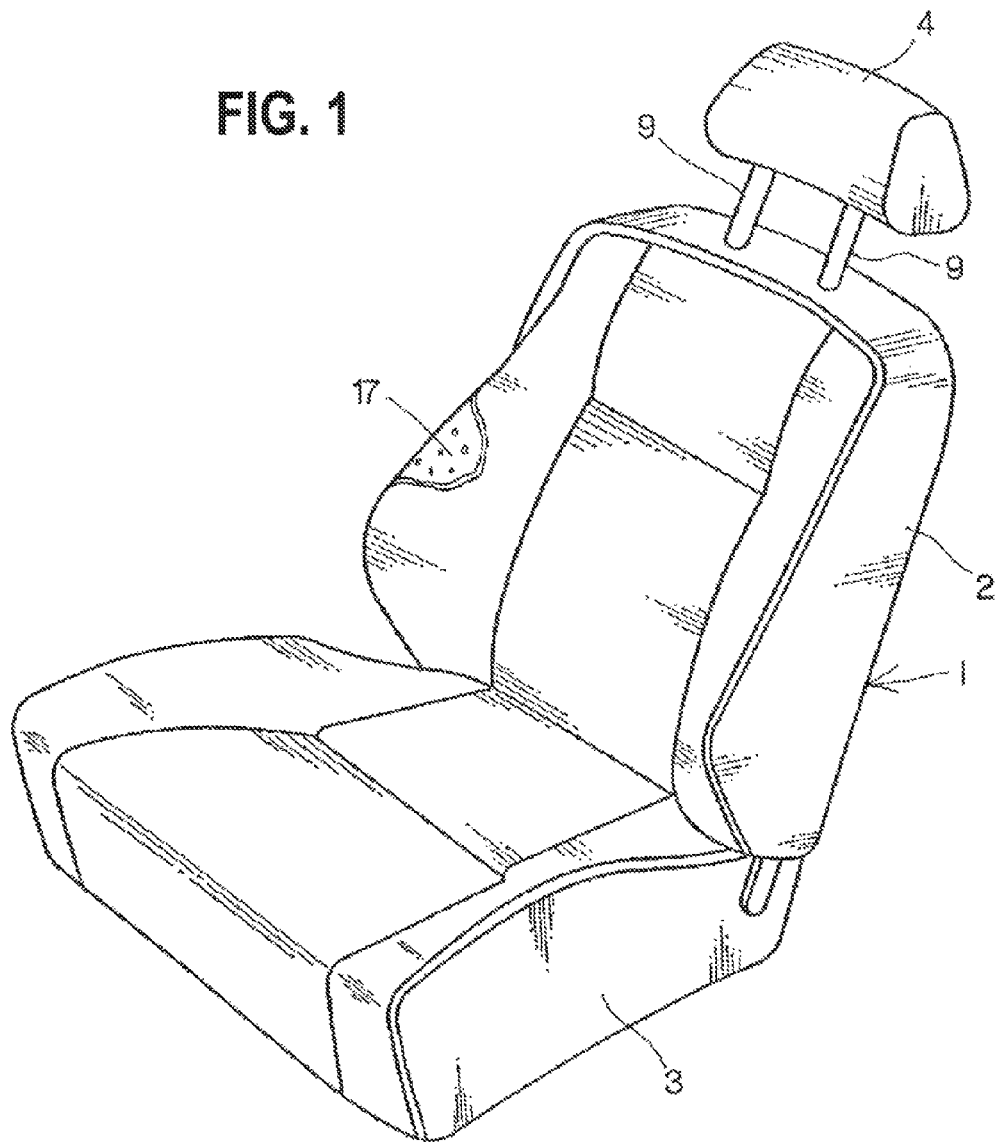
FIG. 1 is a perspective view showing a vehicle seat.
Figure 2:
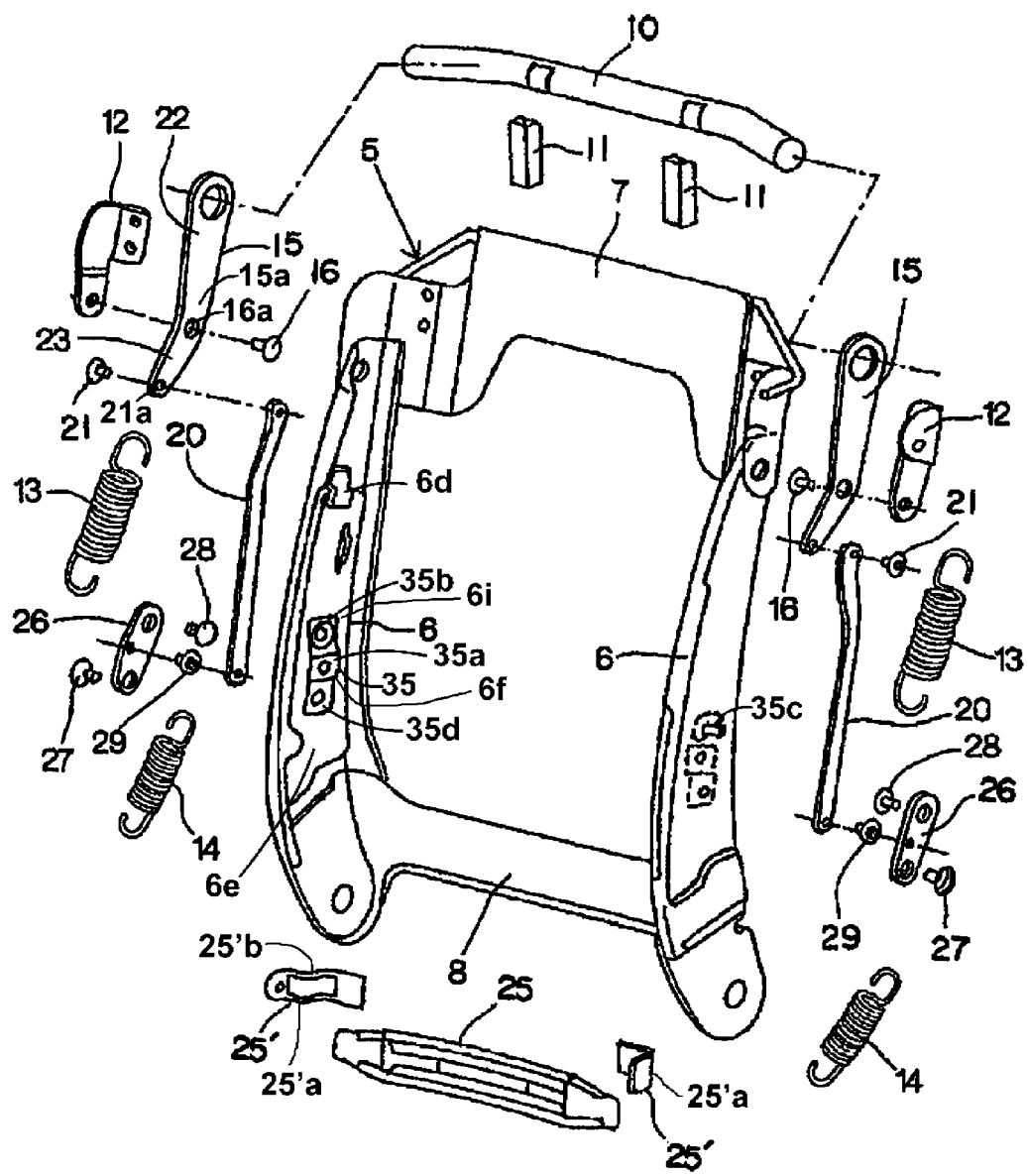
FIG. 2 is an exploded perspective view showing a seat back frame of the vehicle seat and basic components of an active headrest mechanism.
Figure 3:
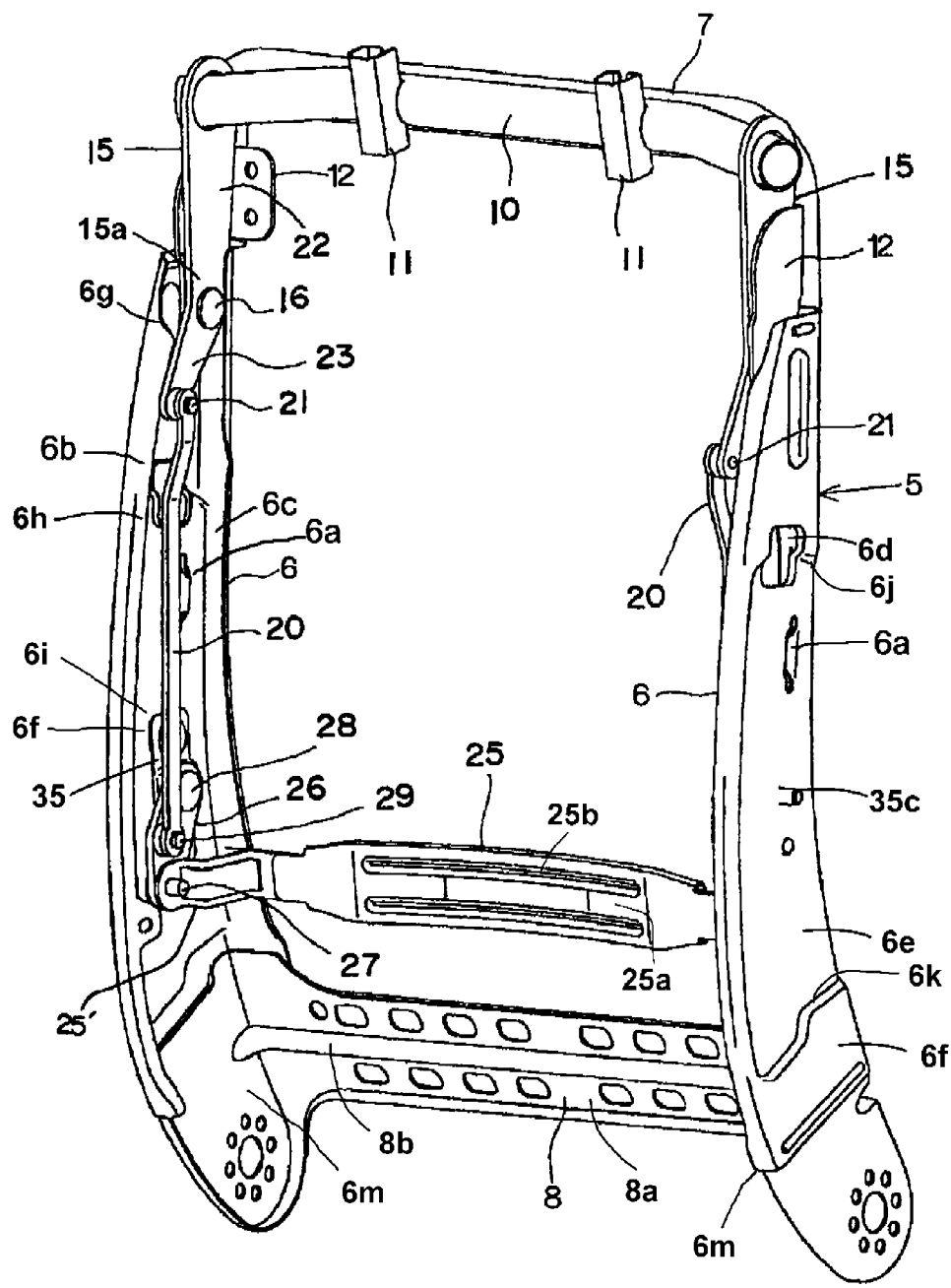
FIG. 3 is a perspective view showing an assembly of the components shown in FIG. 2.
Figure 4:
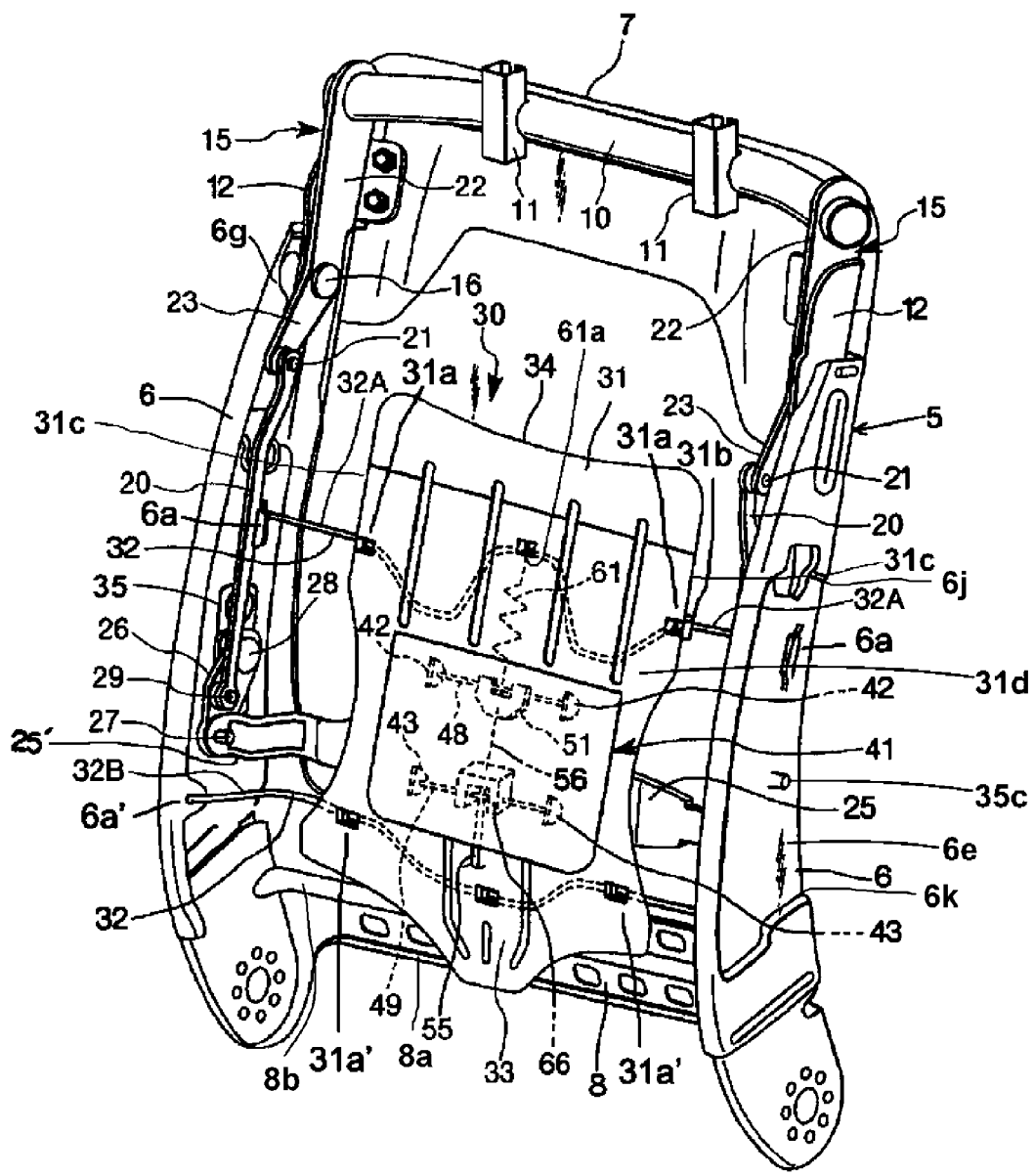
FIG. 4 is a perspective view showing a state that a cushion plate and an auxiliary plate are mounted to the assembly of FIG. 3.

An embodiment of the present invention will be described with reference to the accompanying drawings. Referring to FIGS. 1-4, a vehicle seat 1 of the present invention has a seat back 2, a seat bottom 3 and a headrest 4 provided at the top of the seat back 2. Referring to FIGS. 2 and 3, a seat back frame 5 of the seat back 2 includes a pair of side frames 6, an upper frame 7 and a lower frame 8 having a connecting plate 8a and a projecting curve portion 8b, the lower frame having a substantial rectangular shape.

A headrest support 10 is arranged near the upper frame 7. The support 10 horizontally extends and is movable with respect to the seat back frame 5. Lower parts of pillars 9 of the headrest 4 are inserted into vertical engaging parts 11 which are fixed to the headrest support 10. The pillars 9 are vertically adjustable with the aid of the vertical engaging parts 11.

Upper brackets 12 are fixed to the side frames 6, respectively. The frames 6 comprise a front projecting wall (front extending portion) 6b. a rear projecting wall (rear extending portion) 6c. an opening 6d. an inwardly side projecting 6e. a lateral face 6f. a concave portion 6g. which may be a cutout portion formed at a portion of an inner end portion 6h of the front projecting wall (front extending portion) 6b of the side frame 6 that faces at least a part of the bracket 12, where the concave portion 6g is disposed at a position facing a link support shaft 16. The frames 6 also comprise a support member attachment portion 6i. a first step portion 6j. a second step portion 6k. and a lower side frame portion 6m.

Figure 5:
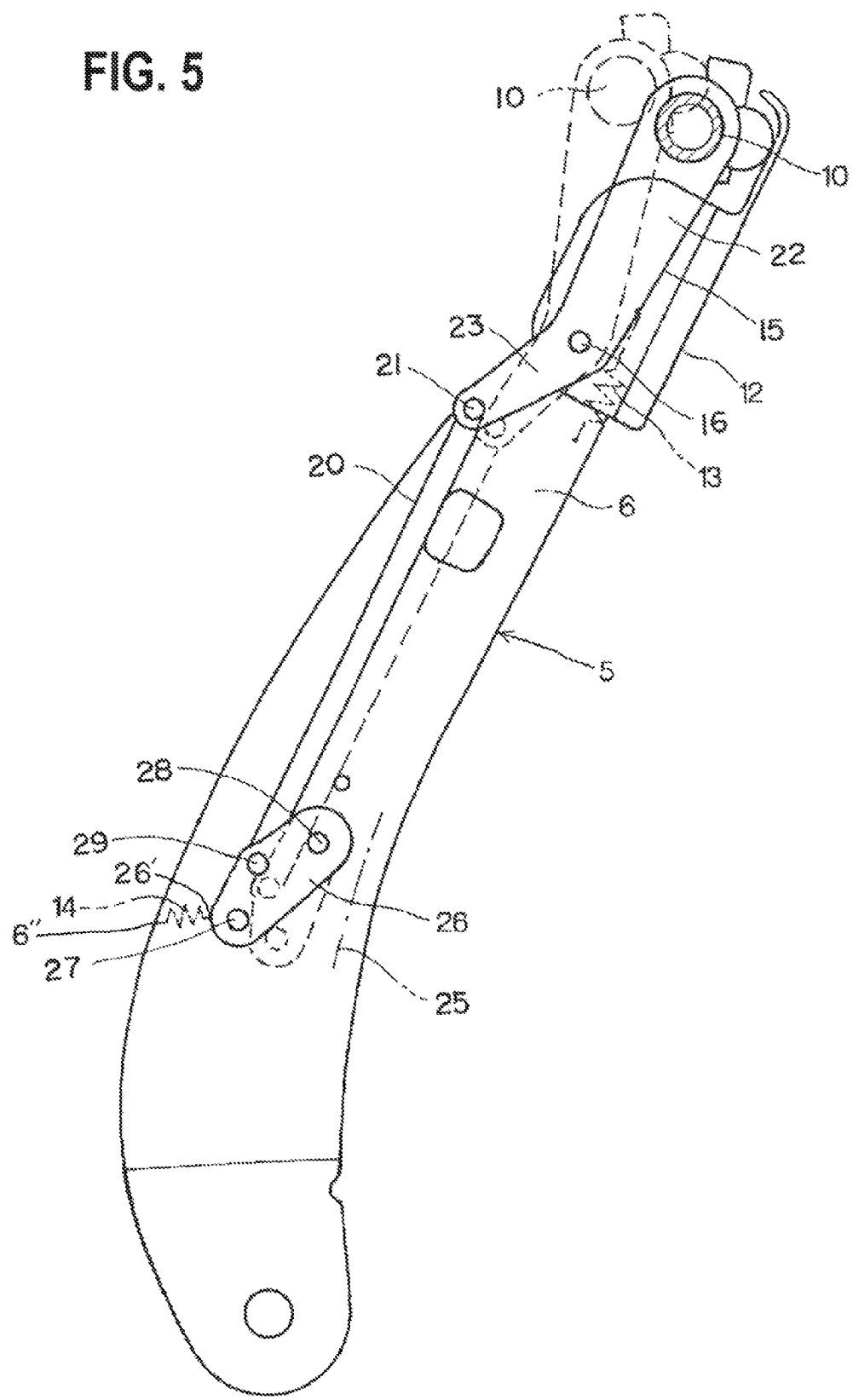
FIG. 5 is a side view showing a side frame of the seat back frame and the basic components of the active headrest mechanism.
Figure 6:
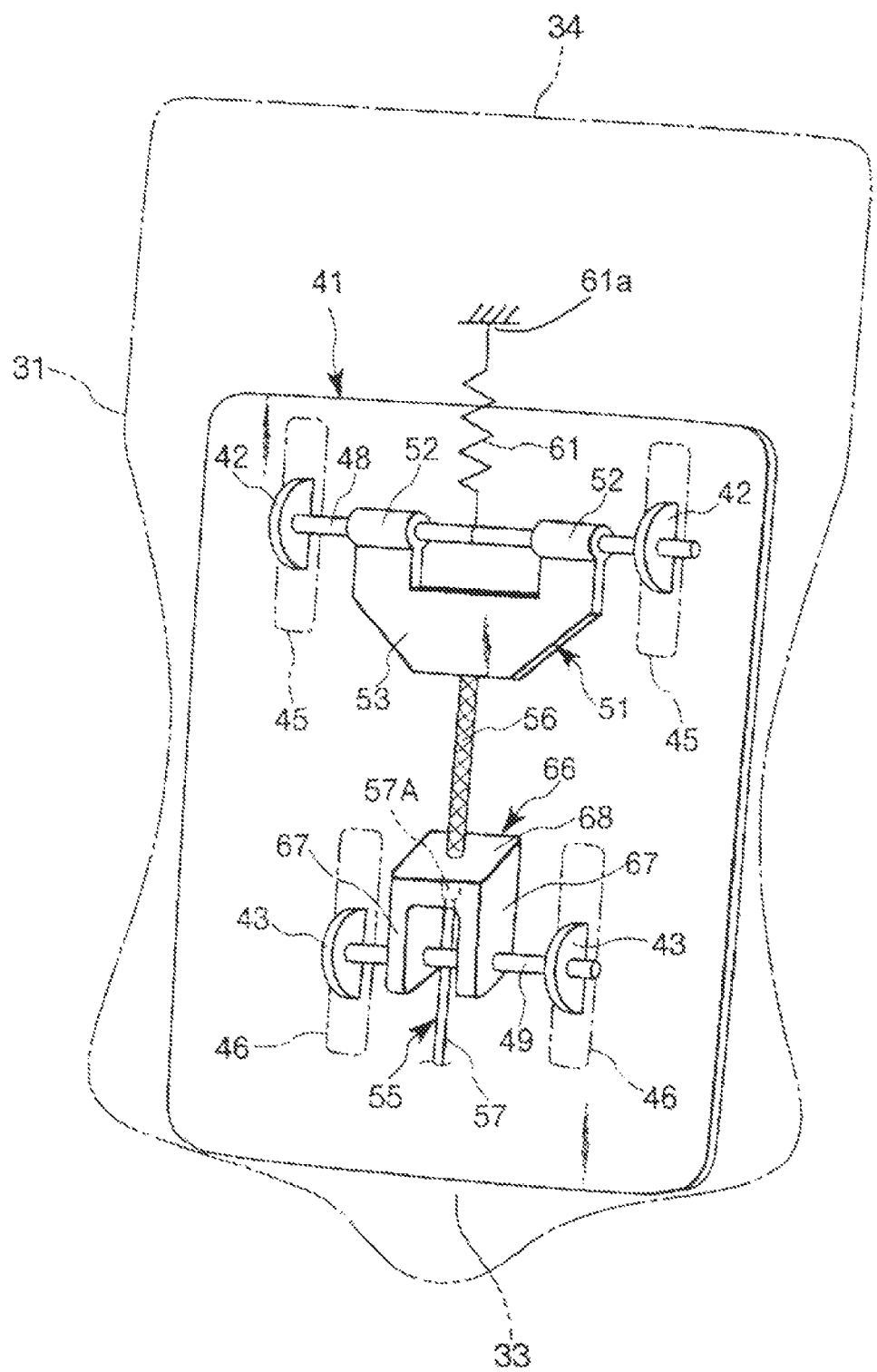
FIG. 6 is a perspective view showing the back sides of the cushion plate and the auxiliary plate.

An upper link (link member) or bell crank 15 is rotatably mounted to each upper bracket 12 by a shaft 16 that protrudes through a first hole 16a of the upper link 15 at a link support portion 15a. Each upper link 15 includes an upper long arm 22 extending upward and a lower short arm 23 extending downwardly and to the front side. The upper link 15 is urged by resiliency of an upper spring 13 clockwise, as shown in FIG. 5. The upper spring 13 includes a first end coupled to the upper link 15 and a second end coupled to the side frame 6. The right and left ends of the headrest support 10 are coupled to the upper arms 22, respectively. Each lower arm 23 is axially fixed to the upper part of a longitudinally extending coupling (or load transmission) rod 20 by way of a pin 21 that extends through a second hole 21a of the upper link 15.

The upper link 15 is normally held at a position indicated by a solid line in FIG. 5 by the resiliency of the upper spring 13 or the like, whereby the headrest 4 is also held at a normal position. However, when the upper link 15 is rotated counterclockwise toward a position indicated by a dotted line, the headrest support 10 forwardly moves and the headrest 4 is pushed to the front.

A horizontally extending vehicle rear-end collision detector 25 is arranged between the side frames 6, 6. The collision detector 25 comprises a contact portion 25a, and a reinforcing portion 25b (bead). When a rear-end collision occurs and the vehicle seat 1 relatively moves forward against the vehicle seat occupant T (FIG. 7), the collision detector 25 (FIGS. 3, 4) moves rearward by being pushed by the seat occupant T. Both ends of the collision detector 25 are coupled to lower links 26, 26 by way of pins 27, 27 (also "swinging shaft" or "connecting shaft") which are axially fixed to the side frames 6, 6 by link support shafts 28, 28, via connecting members 25', 25' respectively. A lower bracket 35 is provided having a link shaft supporting face 35a, a first attachment portion 35b, and a second attachment portion 35d. The lower bracket 35 may attach via a bracket attachment portion 35c. The connecting members 25' each comprise a bend portion 25'a and a strengthening portion 25'b. The lower part of the coupling rod 20 is coupled to the lower link (link member) 26 by way of a pin 29. As shown in FIG. 5, one end of a lower spring (biasing member) 14 is coupled to the lower link 26 at a first biasing member engagement portion 26', while the other end thereof is coupled to the side frame 6 at a second biasing member engagement portion 6'', whereby the lower links 26 are urged counterclockwise. As a result, the collision detector 25 is held at a normal position, located in the front side.

When a rear-end collision occurs, the vehicle rear-end collision detector 25 is pushed by the seat occupant T to move rearward and to turn the lower links 26 counterclockwise in FIG. 5 and to lower the coupling rod 20. At this time, a distance between the pin 29 and the shaft 28 is shorter than a distance between the pin 27 and the shaft 28, so that a backward movement of the collision detector 25 is efficiently transmitted to the coupling rod 20. A downward movement of the rod 20 rotates the upper link 15 counterclockwise so that the headrest support 10 moves forward. The upper arm 22 of the upper link 15 is longer than the lower arm 23 so that the downward movement of the coupling rod 20 efficiently causes the headrest support 10 to move forward. The forward movement of the headrest support 10 pushes the headrest 4 to the front, thereby protecting a head (neck) of the seat occupant T at the time of the rear-end collision.

The side frames 6 are formed with a metal plate having a predetermined width as viewed in the front-and-back direction. A transmission mechanism for transmitting a backward movement of the vehicle rear-end collision detector 25 to the headrest support 10 is located at a position near the side frames 6. Accordingly, a cushion 17 of the seat back 2 does not interfere with a motion of the transmission mechanism. A mechanism ranging from the collision detector 25 to the headrest support 10 forms an active headrest mechanism.

A flexible plate member 30 comprises a flexible cushion plate 31 and a flexible auxiliary plate 41. The flexible cushion plate 31 is arranged inside the seat back frame 5. The cushion plate 31 is preferably made of synthetic resin such as polypropylene, and is substantially a single rectangular plate. The cushion plate 31 is attached to seat springs 32 such as zigzag springs or formed wire springs at mounting portions (wire engagement portions) 31a, 31a' that may include a rearward projecting portion 31b. The cushion plate 31 has a first plate portion 31d. The seat springs 32 include at least an upper seat spring/wire member 32A and a lower seat spring 32B, the lower seat spring 32B being attached to the cushion plate 31 at a mounting portion 31a' within a protruding portion 31c, and to the side frame 6 at a wire spring engagement portion 6a'. The seat springs 32 horizontally extend and are respectively coupled to the side frames 6 of the seat back frame 5 at wire spring engagement portions 6a, 6a'. The seat back cushion 17 is provided in front of the cushion plate 31.

When the flexible cushion plate 31 receives a load from the seat occupant T, the cushion plate 31 moves rearward against the elasticity of the seat springs 32 and flexibly supports the seat occupant T. The cushion plate 31 supports the seat back cushion 17 in "plane". Therefore, the cushion plate makes the seat occupant T feel more stable and comfortable than the conventional one in which the seat back cushion 17 is supported by only the seat springs 32.

Figure 7:
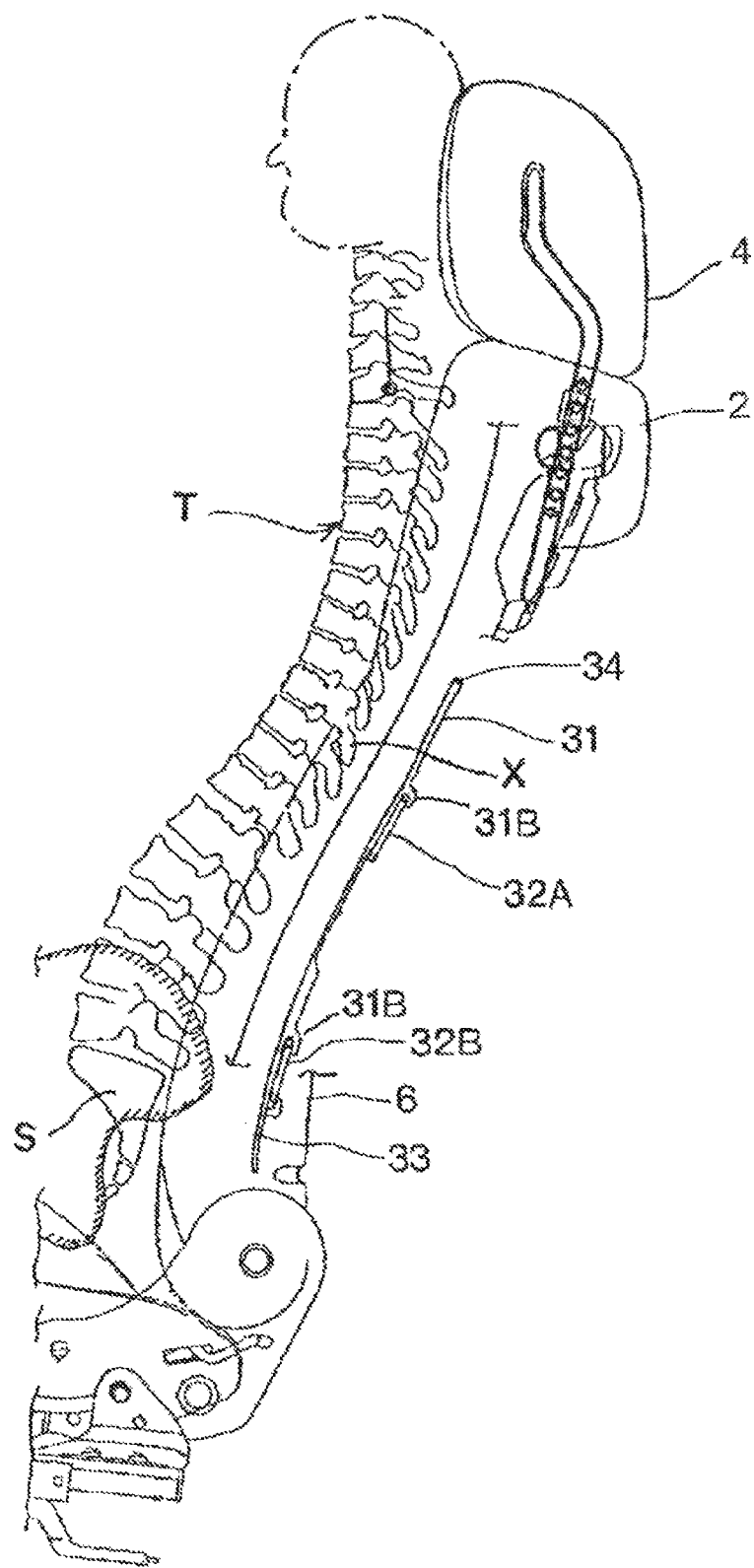
FIG. 7 is a side view showing a relationship between a part of skeleton of a seated person and the cushion plate.
Figure 8:
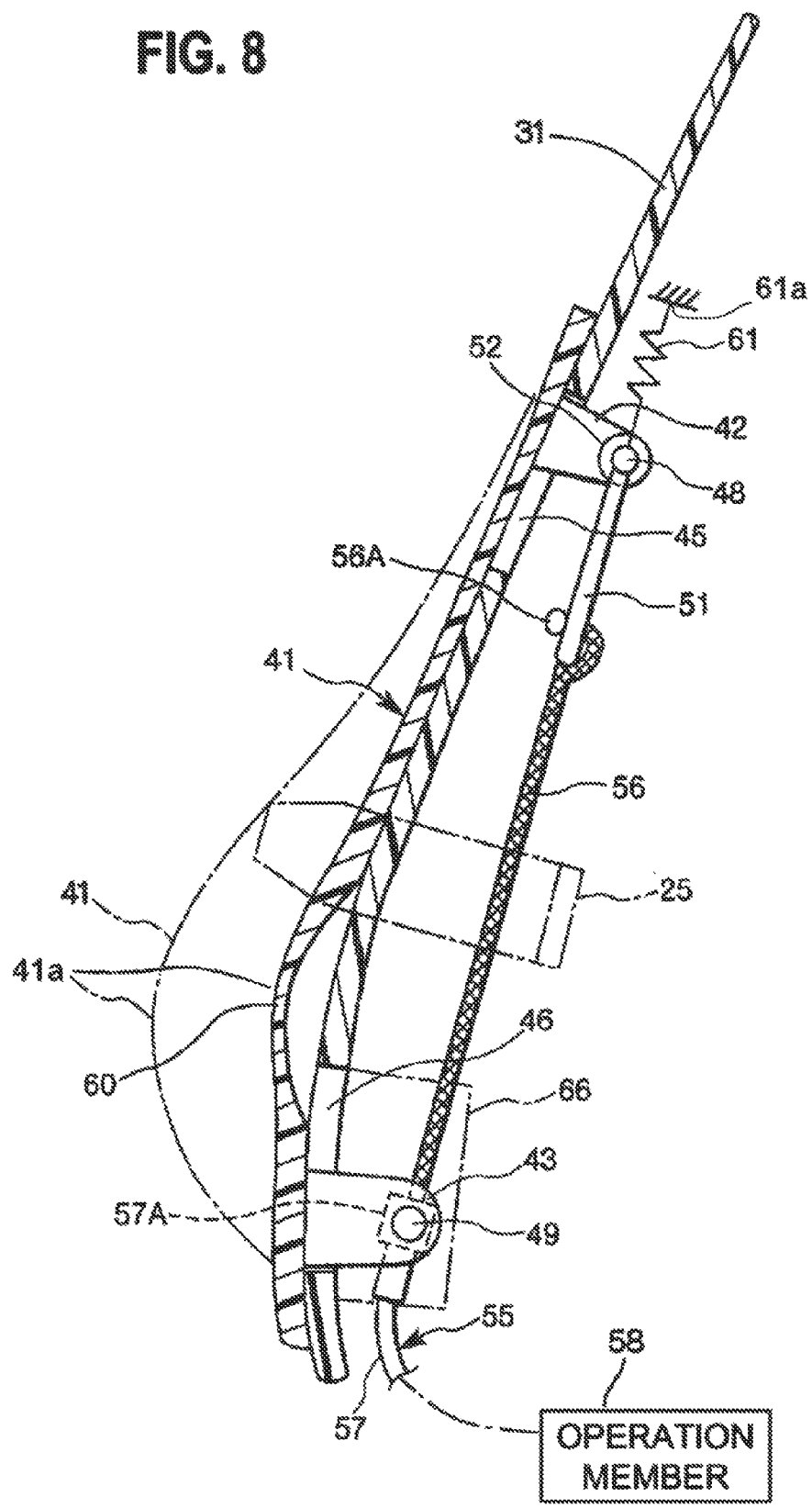
FIG. 8 is a longitudinal sectional view showing the cushion plate and the auxiliary plate.

An upper edge 34 of the flexible cushion plate 31, as shown in FIG. 7, is located somewhat higher than the ninth thoracic vertebra X of the seat occupant T of the average height. The center gravity of the upper body of the seat occupant T is positioned near the ninth thoracic vertebra X. The cushion plate 31 is able to effectively support a part around the center of gravity of the seat occupant T.

The upper seat spring 32A is selected to be at substantially the same height level as the ninth thoracic vertebra X or somewhat lower than it. In FIG. 7, the upper seat spring 32A is located somewhat lower than the ninth thoracic vertebra X. The reason for this is that a load of the upper part of the body to the seat back cushion 17 usually acts on the rearward side.

The flexible cushion plate 31 includes a lower part 33 for supporting a portion near the sacrum S of the pelvis. The lower part 33 enhances a holding property at a portion near the hip of the seat occupant T.

The vehicle rear-end collision detector 25 is located in the rear of the flexible cushion plate 31 in a state that a predetermined space is present therebetween. Since the cushion plate 31 takes a plate-like shape for broadly covering the back of the seat occupant T, the flexible cushion plate 31 receives a load of the seat occupant T on a wide area when a rear-end collision occurs, and moves rearwardly. The amount of a rearward movement of the flexible cushion plate 31 is the largest between a mid portion as vertically viewed and a portion somewhat lower than the mid position. Therefore, the collision detector 25 is preferably located at a mid position as vertically viewed or a position somewhat lower than the mid position in order to reliably receive the rearward movement of the cushion plate 31. Since a width of the seat back 2 as viewed in the front-and-back direction becomes narrower upward, it is not preferable that the collision detector 25 is located at an upper position on the rear side of the flexible cushion plate 31.

A flexible auxiliary plate 41 is provided between the flexible cushion plate 31 and the seat back cushion 17. Collectively, the flexible cushion plate 31 and auxiliary plate 41 may be construed as a load receiving member. The auxiliary plate 41 is preferably made of synthetic resin such as polypropylene, and is substantially a single rectangular plate, which is smaller than the flexible cushion plate 31. When the auxiliary plate 41 is operated by the seat occupant T, it is bent to the front and pushes the seat back cushion 17 forwardly, thereby adjusting a cushion pressure against the seat occupant T.

The auxiliary plate 41, which has a top portion (or a maximum forward curve portion) 41a, is provided with rearward projecting upper sliders 42 and lower sliders 43. The upper sliders 42 protrude in a rearward projecting portion 42a to the rear side of the flexible cushion plate 31 through vertical upper slits 45 formed in the cushion plate 31. The lower sliders 43 protrude to the rear side of the cushion plate 31 through vertical lower slits 46 formed in the cushion plate 31. An upper horizontal mounting shaft 48 is bridged between the upper sliders 42 and 42, and a lower horizontal mounting shaft 49 is bridged between the lower sliders 43 and 43.

The auxiliary plate 41 is mounted to the cushion plate 31 by using the mounting shafts 48 and 49. The sliders 42 and 43 are vertically slidable in the slits 45 and 46, respectively. When the upper sliders 42 are moved downwardly and the lower sliders 43 are moved upwardly, the auxiliary plate 41 is bent to the front.

An upper U-shaped bracket 51 is rotatably mounted on the upper horizontal mounting shaft 48. The bracket 51 includes a pair of arms 52 mounted to the mounting shaft 48 and a coupling part 53 provided between the arms 52. A cable head 56A of an inner cable 56 of a wire cable 55 is placed on and secured to the coupling part 53. A lower bracket 66 is rotatably mounted to the lower horizontal mounting shaft 49. The lower bracket 66 includes a pair of arms 67 mounted to the mounting shaft 49 and a coupling part 68 provided between the arms 67. A tube head 57A of an outer tube 57 of the wire cable 55 is placed on and secured to the lower bracket 66. The other end of the wire cable 55 is coupled to an operation member 58 provided on the vehicle seat 1.

When the operation member 58 is operated, a distance between the cable head 56A and the tube head 57A, i.e., a distance between the upper sliders 42 and the lower sliders 43 is adjusted. When the distance becomes long, the auxiliary plate 41 is parallel to the flexible cushion plate 31, and when it becomes short, the auxiliary plate 41 bends to project to the front. Thus, by operating the operation member 58, a degree of bending (forward projecting quantity) of the auxiliary plate 41 can be adjusted.

The auxiliary plate 41 includes a thin part 60 for defining a curved shape of the auxiliary plate 41. When the distance between the upper sliders 42 and the lower sliders 43 becomes short, the auxiliary plate 41 is curved with respect to the thin part 60. Accordingly, the curved shape of the auxiliary plate 41 is kept in a predetermined shape, and the cushion pressure adjustment by the auxiliary plate 41 is made effective by setting the thin part 60 at the lumber part of the seat occupant T.

A spring 61, having an upper end attaching portion 61a for urging the upper horizontal mounting shaft 48 upwardly is provided between the upper horizontal mounting shaft 48 and the flexible cushion plate 31 (or the upper seat spring 32A).

The flexible cushion plate 31 bends under a load from the seat occupant T and moves rearward against the elasticity of the seat springs 32, and flexibly supports the seat occupant T. The flexible cushion plate 31 supports the seat back cushion 17 in "plane". Therefore, the cushion plate makes the seat occupant T feel more stable and comfortable than the conventional one in which the seat back cushion 17 is supported by only the seat springs 32.

When a physique of the seat occupant T presents an insufficient pressure from the seat back cushion 17, the seated person pulls the inner cable 56 by operating the operation member 58 to reduce the distance between the upper sliders 42 and the lower sliders 43. Then, the auxiliary plate 41 protrudes forward with respect to the thin part 60, pushes the seat back cushion 17 forward to increase the cushion pressure, whereby the cushion pressure is adjusted as the seat occupant T desires.

When the auxiliary plate 41 is curved by the operation member 58, the cushion pressure is changed. Since the auxiliary plate 41 and the flexible cushion plate 31 are in overlapping relation, the load by the seat occupant T that the auxiliary plate 41 receives is directly dispersed into the flexible cushion plate 31 as a single large plate. Accordingly, the good stability and comfort of the seat back cushion 17 are not lost.

When a rear-end collision occurs, the flexible cushion plate 31 greatly moves rearward by the load from the seat occupant T to come into contact with the vehicle rear-end collision detector 25 and to move it backward. In turn, the lower links 26, in FIG. 5, rotate counterclockwise to lower the coupling rod 20. The downward movement of the coupling rod 20 turns the upper links 15 counterclockwise to move the headrest support 10 to the front. As a result, the headrest 4 pushed to the front to protect the head (neck) of the seat occupant T against the impact by the rear-end collision.

In this case, the distance between the pin 29 and the shafts 28 is shorter than that between the pins 27 and the shafts 28. Accordingly, the lower links 26 efficiently transmits the rearward movement of the collision detector 25 to the coupling rod 20. Since the upper arms 22 of the upper links 15 are longer than the lower arms 23, the downward movement of the coupling rod 20 is efficiently transmitted to the headrest support 10. Therefore, the forward movement of the headrest 4 is satisfactorily secured.

Since the cushion plate 31 is shaped like a plate broadly covering the back of the seat occupant T, it reliably receives the rearward movement of the seat occupant T at the time of the rear-end collision in a broad area to reliably transmit the rearward movement of the seat occupant T to the collision detector 25.

When the auxiliary plate 41 is bent by the operation member 58, the cushion pressure is changed. Since the flexible cushion plate 31 is shaped like a plate broadly covering the back of the seat occupant T, and receives the load from the seat occupant T in a dispersing manner, the change of the cushion pressure by the auxiliary plate 41 does not substantially move the positions of the flexible cushion plate 31 and the collision detector 25. Accordingly, the relative position of the cushion plate 31 to the collision detector 25 is retained and the change of the cushion pressure by the auxiliary plate 41 does not substantially interfere with the function of the active headrest mechanism.

Table of Reference Characters
1 vehicle seat
2 seat back
3 seat bottom
4 headrest
5 seat back frame
6 side frame
6a, 6a' wire spring engagement portions
6b side frame front projecting wall
6c side frame rear projecting wall
6d opening
6e inwardly protruding portion, side projecting portion
6f lateral face
6g concave (cutout) portion
6h inner end portion
6i support member attachment portion
6j first step portion
6k second step portion
6m lower side frame portion
6" second biasing member engagement portion
7 upper frame
8 lower frame
8a connecting plate
8b projecting curve portion
9 pillars
10 headrest support (also "lateral member")
11 vertical engaging parts
12 upper bracket
13 upper spring
14 lower spring (also "biasing member")
15 upper link (also "link member")
15a link support portion
16 link support shaft
16a first hole of upper link
17 cushion
20 longitudinally extending coupling rod (or "load transmission rod")
21 pin
21a second hole of upper link
22 upper link upper (second) long arm
23 upper link lower (first) short arm
25 rear-end collision detector
25a contact portion
25b reinforcing portion (bead)
25' connecting member
25'a bend portion
25'b strengthening portion
26 lower link (also "link member")
26' first biasing member engagement portion
27 pin (also "swinging shaft" or "connecting shaft")
28 link support shaft
29 pin
30 flexible plate member
31 flexible cushion plate
31a. 31a' mounting portions (also "wire engagement portions")
31b projecting portion
31c protruding portion
31d first plate portion
32 seat springs
32A upper seat spring/wire member
32B lower seat spring
33 lower part of flexible cushion plate
34 upper edge of flexible cushion plate
35 lower bracket
35a link shaft supporting face
35b first attachment portion
35c bracket attachment portion
35d second attachment portion
41 flexible auxiliary plate
41a top portion (maximum forward portion of a curve) of auxiliary plate
42 rearward projecting upper slider
42a rearward projection portion ("retainer")
43 lower slider
45 vertical upper slit
46 vertical lower slit
48 upper horizontal mounting shaft (also "linear member")
49 lower horizontal mounting shaft
51 upper U-shaped bracket
52 arms
53 coupling part
55 wire cable
56 inner cable
56A cable head
57 outer tube
57A tube head
58 operation member
60 auxiliary plate thin part
61 spring
61a spring upper end attaching portion
66 lower bracket
67 lower bracket arm
68 coupling part
T occupant

What is claimed is:

1. A vehicle seat comprising:
a seat back frame having right and left side frames;
a headrest mounted to the seat back frame;
a rear-end collision detector mounted to the seat back frame, wherein the rear-end collision detector detects rearward movement of a seat occupant and moves rearward; and the rear-end collision detector acts such that the rearward movement of the rear-end collision detector reduces a distance between a head of the seat occupant and the headrest;
a respective support shaft mounted to each side frame;
a support member that supports the support shaft;
a link member mounted to the support shaft; and
a biasing member that biases the link member;
wherein:
a lower portion of the link member is connected to the rear-end collision detector;
each of the side frames is provided with a front projecting wall inwardly projecting and integrally formed at a front end of the respective side frame, and a rear projecting wall inwardly projecting and integrally formed at a rear end of the respective side frame;
each of the side frames comprises a lateral face, the lateral face comprising a concave portion that is indented or concave in a direction towards the other side frame;
at least a part of the support member is attached to the concave portion;
the concave portion is provided with an opening and a support member attachment portion for attaching the support member; and the opening is disposed above the support member attachment portion.

2. The vehicle seat according to claim 1, wherein:
the concave portion extends above an upper end portion of the link member and below a lower end portion of the link member.

3. The vehicle seat according to claim 1, further comprising:
a transmission member for transmitting the rearward movement of the seat occupant to the headrest;
wherein:
the transmission member overlaps with the opening in a seat right-to-left direction;
the at least the part of the support member includes a fixing portion and is fixed to the concave portion via the fixing portion; and
the opening is disposed above a lower end of the fixing portion of the support member.

4. The vehicle seat according to claim 1, further comprising:
an opening formed in the concave portion; and
a transmission member for transmitting the rearward movement of the seat occupant to the headrest;
wherein:
the transmission member overlaps with the opening in a seat right-to-left direction when the transmission member moves rearward;
the support member has an upper fixing portion and a lower fixing portion, and is fixed to the side frame via the upper fixing portion and the lower fixing portion;
at least one of the upper fixing portion and the lower fixing portion is fixed to the concave portion; and
the opening is disposed above a lower end of the upper or lower fixing portion which is fixed to the concave portion.

5. The vehicle seat according to claim 1, wherein:
a connecting plate that is connected to and located between respective lower portions of the side frames, the connecting plate comprising a projecting curve portion that projects forward; and
the projecting curve portion is larger than the rear-end collision detector in length in a seat right-to-left direction;
the vehicle seat further comprising:
a flexible plate member disposed in front of the rear-end collision detector and being bendable to have a forward curvature, wherein a lower end portion of the flexible plate member is disposed in a same horizontal plane as and in front of the projecting curve portion of the connecting plate.

6. The vehicle seat according to claim 1, wherein:
the concave portion is provided with a support member attachment portion for attaching the support member;
the support member attachment portion is disposed between the front projecting wall and the rear projecting wall;
the support member has an upper fixing portion and a lower fixing portion, and is fixed to the side frame via the upper fixing portion and the lower fixing portion; and
the lower fixing portion is fixed to the concave portion at a position posterior to the front projecting wall and anterior to the rear projecting wall.

7. The vehicle seat according to claim 1, further comprising:
a transmission member for transmitting the rearward movement of the seat occupant to the headrest;
wherein:
the concave portion is provided with an opening and a support member attachment portion for attaching the support member;
the opening is disposed at a different height from the support member attachment portion and overlaps with the transmission member in a seat right-to-left direction;
the support member attachment portion is disposed between the front projecting wall and the rear projecting wall;
the support member has an upper fixing portion and a lower fixing portion, and is fixed to the side frame via the upper fixing portion and the lower fixing portion;
the lower fixing portion is fixed to the concave portion; and
the opening is disposed above a lower end of the lower fixing portion.

8. The vehicle seat according to claim 1, wherein:
the at least the part of the support member includes a fixing portion and is fixed to the concave portion via the fixing portion; and
the opening is disposed above a lower end of the fixing portion of the support member.

9. The vehicle seat according to claim 1, wherein:
the support member has an upper fixing portion and a lower fixing portion, and is fixed to the side frame via the upper fixing portion and the lower fixing portion;
at least one of the upper fixing portion and the lower fixing portion is fixed to the concave portion; and
the opening is disposed above a lower end of the upper or lower fixing portion which is fixed to the concave portion.

10. The vehicle seat according to claim 1, wherein:
the support member has an upper fixing portion and a lower fixing portion, and is fixed to the side frame via the upper fixing portion and the lower fixing portion;
the lower fixing portion is fixed to the concave portion; and
the opening is disposed above a lower end of the lower fixing portion.

11. The vehicle seat according to claim 1, wherein:
the support member has an upper fixing portion and a lower fixing portion, and is fixed to the side frame via the upper fixing portion and the lower fixing portion;
the lower fixing portion is fixed to the concave portion; and
the opening is formed above an upper end of the upper fixing portion.

12. The vehicle seat according to claim 1, wherein the rearward movement of the rear-end collision detector forwardly moves the headrest to reduce the distance between the head of the seat occupant and the headrest.

13. A vehicle seat comprising:
a seat back frame having right and left side frames;
a headrest forwardly movably mounted to the seat back frame;
a rear-end collision detector mounted to the seat back frame, wherein the rear-end collision detector detects rearward movement of a seat occupant and moves rearward; and the rear-end collision detector acts such that the rearward movement of the rear-end collision detector reduces a distance between a head of the seat occupant and the headrest;
a respective support shaft mounted to each side frame;
a support member that supports the support shaft;
a link member mounted to the support shaft; and
a biasing member that biases the link member;
wherein:
a lower portion of the link member is connected to the rear-end collision detector;

each of the side frames is provided with a front projecting wall inwardly projecting and integrally formed at a front end of the respective side frame, and a rear projecting wall inwardly projecting and integrally formed at a rear end of the respective side frame;

each of the side frames comprises a lateral face, the lateral face comprising a first step portion and a second step portion;

a part of the support member is attached between the first step portion and the second step portion;

an opening is formed in the side frame;

a support member attachment portion for attaching the support member is formed between the first step portion and the second step portion; and the opening is disposed above the support member attachment portion.

14. The vehicle seat according to claim 13, wherein:
the first step portion is disposed above an upper end portion of the link member and the second step portion is disposed below a lower end portion of the link member.

15. The vehicle seat according to claim 13, wherein:
an opening is formed at least at a portion of either the first step portion or the second step portion;
the at least the part of the support member includes a fixing portion and is fixed to the concave portion via the fixing portion; and
the opening is disposed above a lower end of the fixing portion of the support member.

16. The vehicle seat according to claim 13, further comprising:
an opening formed between the first step portion and the second step portion; and
a transmission member for transmitting the rearward movement of the seat occupant to the headrest;
wherein:
the transmission member overlaps with the opening in a seat right-to-left direction;
the at least the part of the support member includes a fixing portion and is fixed to the concave portion via the fixing portion; and
the opening is disposed above a lower end of the fixing portion of the support member.

17. The vehicle seat according to claim 13, further comprising:
an opening formed between the first step portion and the second step portion; and
a transmission member for transmitting the rearward movement of the seat occupant to the headrest;
wherein:
the transmission member overlaps with the opening in a seat right-to-left direction when the transmission member moves rearward;
the support member has an upper fixing portion and a lower fixing portion, and is fixed to the side frame via the upper fixing portion and the lower fixing portion;
at least one of the upper fixing portion and the lower fixing portion is fixed to the concave portion; and
the opening is disposed above a lower end of the upper or lower fixing portion which is fixed to the concave portion.

18. The vehicle seat according to claim 13, wherein:
a connecting plate that is connected to and located between respective lower portions of the side frames, the connecting plate comprising a projecting curve portion that projects forward; and
the projecting curve portion is larger than the rear-end collision detector in length in a seat right-to-left direction.

19. The vehicle seat according to claim 13, wherein:
a support member attachment portion for attaching the support member is formed between the first step portion and the second step portion;
the support member attachment portion is disposed between the front projecting wall and the rear projecting wall;
the support member has an upper fixing portion and a lower fixing portion, and is fixed to the side frame via the upper fixing portion and the lower fixing portion; and
the lower fixing portion is fixed to the concave portion at a position posterior to the front projecting wall and anterior to the rear projecting wall.

20. The vehicle seat according to claim 13, further comprising:
a transmission member for transmitting the rearward movement of the seat occupant to the headrest;
wherein:
an opening and a support member attachment portion for attaching the support member are formed between the first step portion and the second step portion;
the opening is disposed at a different height from the support member attachment portion and overlaps with the transmission member in a seat right-to-left direction;
the support member attachment portion is disposed between the front projecting wall and the rear projecting wall;
the support member has an upper fixing portion and a lower fixing portion, and is fixed to the side frame via the upper fixing portion and the lower fixing portion;
the lower fixing portion is fixed to the concave portion; and
the opening is disposed above a lower end of the lower fixing portion.

21. The vehicle seat according to claim 13, wherein:
the at least the part of the support member includes a fixing portion and is fixed between the first step portion and the second step portion via the fixing portion; and
the opening is disposed above a lower end of the fixing portion of the support member.

22. The vehicle seat according to claim 13, wherein:
the support member has an upper fixing portion and a lower fixing portion, and is fixed to the side frame via the upper fixing portion and the lower fixing portion;
at least one of the upper fixing portion and the lower fixing portion is fixed between the first step portion and the second step portion; and
the opening is disposed above a lower end of the upper or lower fixing portion which is fixed between the first step portion and the second step portion.

23. The vehicle seat according to claim 13, wherein:
the support member has an upper fixing portion and a lower fixing portion, and is fixed to the side frame via the upper fixing portion and the lower fixing portion;
the lower fixing portion is fixed between the first step portion and the second step portion; and
the opening is disposed above a lower end of the lower fixing portion.

24. The vehicle seat according to claim 13, wherein:
the support member has an upper fixing portion and a lower fixing portion, and is fixed to the side frame via the upper fixing portion and the lower fixing portion;
the lower fixing portion is fixed between the first step portion and the second step portion; and the opening is formed above an upper end of the upper fixing portion.

25. A vehicle seat comprising:
a seat back frame having right and left side frames;
a headrest forwardly movably mounted to the seat back frame;
a rear-end collision detector mounted to the seat back frame, wherein the rear-end collision detector detects rearward movement of a seat occupant and moves rearward; and the rear-end collision detector acts such that the rearward movement of the rear-end collision detector reduces a distance between a head of the seat occupant and the headrest;
a respective support shaft mounted to each side frame;
a support member that supports the support shaft;
a link member mounted to the support shaft; and
a biasing member that biases the link member;
wherein:
a lower portion of the link member is connected to the rear-end collision detector;
each of the side frames is provided with a front projecting wall inwardly projecting and integrally formed at a front end of the respective side frame, and a rear projecting wall inwardly projecting and integrally formed at a rear end of the respective side frame;
each of the side frames comprises a lateral face, the lateral face comprising a side projecting portion projecting toward a right-to-left direction;
a part of the support member is attached to the side projecting portion;
the side projecting portion is provided with an opening and a support member attachment portion for attaching the support member; and
the opening is disposed above the support member attachment portion.

26. The vehicle seat according to claim 25, wherein:
the side projecting portion extends above an upper end portion of the link member and below a lower end portion of the link member.

27. The vehicle seat according to claim 25, further comprising:
an opening formed in the side projecting portion; and
a transmission member for transmitting the rearward movement of the seat occupant to the headrest;
wherein:
the transmission member overlaps with the opening in a seat right-to-left direction;
the at least the part of the support member includes a fixing portion and is fixed to the concave portion via the fixing portion; and
the opening is disposed above a lower end of the fixing portion of the support member.

28. The vehicle seat according to claim 25, further comprising:
an opening formed in the side projecting portion; and
a transmission member for transmitting the rearward movement of the seat occupant to the headrest;
wherein:
the transmission member overlaps with the opening in a seat right-to-left direction when the transmission member moves rearward;
the support member has an upper fixing portion and a lower fixing portion, and is fixed to the side frame via the upper fixing portion and the lower fixing portion;
at least one of the upper fixing portion and the lower fixing portion is fixed to the concave portion; and
the opening is disposed above a lower end of the upper or lower fixing portion which is fixed to the concave portion.

29. The vehicle seat according to claim 25, wherein:
a connecting plate that is connected to and located between respective lower portions of the side frames, the connecting plate comprising a projecting curve portion that projects forward; and
the projecting curve portion is larger than the rear-end collision detector in length in a seat right-to-left direction.

30. The vehicle seat according to claim 25, wherein:
the side projecting portion is provided with a support member attachment portion for attaching the support member;
the support member attachment portion is disposed between the front projecting wall and the rear projecting wall;
the support member has an upper fixing portion and a lower fixing portion, and is fixed to the side frame via the upper fixing portion and the lower fixing portion; and
the lower fixing portion is fixed to the concave portion at a position posterior to the front projecting wall and anterior to the rear projecting wall.

31. The vehicle seat according to claim 25, further comprising:
a transmission member for transmitting the rearward movement of the seat occupant to the headrest;
wherein:
the side projecting portion is provided with an opening and a support member attachment portion for attaching the support member;
the opening is disposed at a different height from the support member attachment portion and overlaps with the transmission member in a seat right-to-left direction;
the support member attachment portion is disposed between the front projecting wall and the rear projecting wall;
the support member has an upper fixing portion and a lower fixing portion, and is fixed to the side frame via the upper fixing portion and the lower fixing portion;
the lower fixing portion is fixed to the concave portion; and
the opening is disposed above a lower end of the lower fixing portion.

32. The vehicle seat according to claim 25, wherein:
the at least the part of the support member includes a fixing portion and is fixed to the side projecting portion via the fixing portion; and
the opening is disposed above a lower end of the fixing portion of the support member.

33. The vehicle seat according to claim 25, wherein:
the support member has an upper fixing portion and a lower fixing portion, and is fixed to the side frame via the upper fixing portion and the lower fixing portion;
the lower fixing portion is fixed to the side projecting portion; and
the opening is disposed above a lower end of the lower fixing portion.

34. The vehicle seat according to claim 25, wherein:
the support member has an upper fixing portion and a lower fixing portion, and is fixed to the side frame via the upper fixing portion and the lower fixing portion;
the lower fixing portion is fixed to the side projecting portion; and
the opening is formed above an upper end of the upper fixing portion.

35. A vehicle seat comprising:
a seat back frame having right and left side frames;
a headrest forwardly movably mounted to the seat back frame;
a rear-end collision detector mounted to the seat back frame, wherein the rear-end collision detector detects rearward movement of a seat occupant and moves rearward; and the rear-end collision detector acts such that the rearward movement of the rear-end collision detector reduces a distance between a head of the seat occupant and the headrest;
a respective support shaft mounted to each side frame;
a support member that supports the support shaft;
a link member mounted to the support shaft;
a biasing member that biases the link member;
a flexible plate member disposed in front of the rear-end collision detector;
a seat back cushion provided in front of the flexible plate member; and
a pressure adjusting mechanism for pushing the seat back cushion to a front direction by forwardly bending the flexible plate member;
wherein:
a lower portion of the link member is connected to the rear-end collision detector;
each of the side frames is provided with a front projecting wall inwardly projecting and integrally formed at a front end of the respective side frame, and a rear projecting wall inwardly projecting and integrally formed at a rear end of the respective side frame;
each of the side frames comprises a lateral face, the lateral face comprising a concave portion that is indented or concave in a direction towards the other side frame;
at least a part of the support member is attached to the concave portion;
the concave portion extends above and below the support shaft;
an upper end of the flexible plate member is disposed above a central axis point of the support shaft;
the concave portion is provided with an opening and a support member attachment portion for attaching the support member; and
the opening is disposed above the support member attachment portion.

36. The vehicle seat according to claim 35, further comprising:
a transmission member for transmitting the rearward movement of the seat occupant to the headrest;
wherein:
the concave portion is provided with an opening and a support member attachment portion for attaching the support member;
the opening is disposed at a different height from the support member attachment portion and overlaps with the transmission member in a seat right-to-left direction when the transmission member moves rearward; and
the support member attachment portion is disposed between the front projecting wall and the rear projecting wall.

37. The vehicle seat according to claim 35, wherein:
a connecting plate that is connected to and located between respective lower portions of the side frames, the connecting plate comprising a projecting curve portion that projects forward; and
the projecting curve portion is larger than the rear-end collision detector in length in a seat right-to-left direction.

38. The vehicle seat according to claim 35, wherein:
the at least the part of the support member includes a fixing portion and is fixed to the concave portion via the fixing portion; and
the opening is disposed above a lower end of the fixing portion of the support member.

39. The vehicle seat according to claim 35, wherein:
the support member has an upper fixing portion and a lower fixing portion, and is fixed to the side frame via the upper fixing portion and the lower fixing portion;
the lower fixing portion is fixed to the concave portion; and
the opening is disposed above a lower end of the lower fixing portion.

40. The vehicle seat according to claim 35, further comprising:
a connecting plate that is connected to and located between respective lower portions of the side frames, the connecting plate comprising a projecting curve portion that projects forward;
wherein:
a lower end portion of the flexible plate member is disposed in a same horizontal plane as and in front of the projecting curve portion of the connecting plate.

41. A vehicle seat comprising:
a seat back frame having right and left side frames;
a headrest forwardly movably mounted to the seat back frame;
a rear-end collision detector mounted to the seat back frame, wherein the rear-end collision detector detects rearward movement of a seat occupant and moves rearward; and the rear-end collision detector acts such that the rearward movement of the rear-end collision detector reduces a distance between a head of the seat occupant and the headrest;
a respective support shaft mounted to each side frame;
a support member that supports the support shaft;
a link member mounted to the support shaft;
a biasing member that biases the link member;
a flexible plate member disposed in front of the rear-end collision detector;
a seat back cushion provided in front of the flexible plate member;
a pressure adjusting mechanism for pushing the seat back cushion to a front direction by forwardly bending the flexible plate member;
a wire member that supports the flexible plate member;
wherein:
a lower end portion of the link member is connected to the rear-end collision detector;
each of the side frames is provided with a front projecting wall inwardly projecting and integrally formed at a front end of the respective side frame, and a rear projecting wall inwardly projecting and integrally formed at a rear end of the respective side frame;
each of the side frames comprises a lateral face, the lateral face comprising a concave portion that is indented or concave in a direction towards the other side frame;
at least a part of the support member is attached to the concave portion;
the concave portion is disposed between the front projecting wall and the rear projecting wall, and extends above and below the support shaft and extends above an upper end portion of the link member and below the lower end portion of the link member;

an upper end of the flexible plate member is disposed above a central axis point of the support shaft;

the wire member is connected to a lower portion of the seat back frame;

a connecting plate that is connected to and located between respective lower portions of the side frames, the connecting plate comprising a projecting curve portion that projects forward;

the projecting curve portion is larger than the rear-end collision detector in length in a seat right-to-left direction;

the concave portion is provided with an opening and a support member attachment portion for attaching the support member; and the opening is disposed above the support member attachment portion.

42. The vehicle seat according to claim 23, further comprising:

a transmission member for transmitting the rearward movement of the seat occupant to the headrest;

wherein:

the concave portion is provided with an opening and a support member attachment portion for attaching the support member;

the opening is disposed at a different height from the support member attachment portion and overlaps with the transmission member in a seat right-to-left direction when the transmission member moves rearward; and the support member attachment portion is disposed between the front projecting wall and the rear projecting wall.

43. The vehicle seat according to claim 41, wherein:

the at least the part of the support member includes a fixing portion and is fixed to the concave portion via the fixing portion; and the opening is disposed above a lower end of the fixing portion of the support member.

44. The vehicle seat according to claim 41, wherein:

the support member has an upper fixing portion and a lower fixing portion, and is fixed to the side frame via the upper fixing portion and the lower fixing portion;

the lower fixing portion is fixed to the concave portion; and the opening is disposed above a lower end of the lower fixing portion.

45. The vehicle seat according to claim 41, wherein a lower end portion of the flexible plate member is disposed in a same horizontal plane as and in front of the projecting curve portion of the connecting plate.

* * * * *

UNITED STATES PATENT AND TRADEMARK OFFICE
CERTIFICATE OF CORRECTION

| | |
|---|---|
| PATENT NO. | : 8,132,858 B2 |
| APPLICATION NO. | : 13/106318 |
| DATED | : March 13, 2012 |
| INVENTOR(S) | : Misao Omori et al. |

It is certified that error appears in the above-identified patent and that said Letters Patent is hereby corrected as shown below:

IN THE CLAIMS:

In Claim 42, Column 17, line 17, replace "The vehicle seat according to claim 23" with -- The vehicle seat according to claim 41 --

Signed and Sealed this
Ninth Day of April, 2013

Teresa Stanek Rea
*Acting Director of the United States Patent and Trademark Office*